US012589371B1

(12) United States Patent
Howard

(10) Patent No.: US 12,589,371 B1
(45) Date of Patent: Mar. 31, 2026

(54) DRYWALL MUD MIXING DEVICE

(71) Applicant: David A Howard, McCalla, AL (US)

(72) Inventor: David A Howard, McCalla, AL (US)

( * ) Notice: Subject to any disclaimer, the term of this patent is extended or adjusted under 35 U.S.C. 154(b) by 0 days.

(21) Appl. No.: 18/214,269

(22) Filed: Jun. 26, 2023

(51) Int. Cl.

| | |
|---|---|
| ***B01F 27/13*** | (2022.01) |
| ***B01F 33/501*** | (2022.01) |
| ***B01F 35/32*** | (2022.01) |
| *B01F 101/28* | (2022.01) |
| *B01F 101/30* | (2022.01) |

(52) U.S. Cl.
CPC ........ *B01F 27/13* (2022.01); *B01F 33/50115* (2022.01); *B01F 35/3204* (2022.01); *B01F 2101/28* (2022.01); *B01F 2101/30* (2022.01); *B01F 2215/0427* (2013.01); *B01F 2215/0431* (2013.01)

(58) Field of Classification Search
CPC ........ B01F 27/13
USPC ..... 366/129, 343, 325.8, 325.94; 416/227 R; D7/412
See application file for complete search history.

(56) References Cited

U.S. PATENT DOCUMENTS

| | | | | | |
|---|---|---|---|---|---|
| 292,821 | A * | 2/1884 | Johnson | A01J 13/00 | 366/325.8 |
| 298,375 | A * | 5/1884 | Henderson | B01F 27/0721 | 366/325.8 |
| 1,598,399 | A * | 8/1926 | Simmonds | B01F 27/806 | 212/292 |
| D141,900 | S * | 7/1945 | Latshaw | D7/412 | |
| 2,575,978 | A * | 11/1951 | Scheidecker | A47J 19/04 | D7/682 |
| 2,778,615 | A * | 1/1957 | Hahn | A47J 43/0711 | 416/240 |
| 5,584,112 | A * | 12/1996 | Diore | A47J 43/0711 | 29/527.3 |
| 5,688,048 | A * | 11/1997 | Duckworth | B01F 27/96 | 416/227 R |
| 5,865,539 | A * | 2/1999 | Rogers | B01F 27/96 | 416/227 R |
| 6,902,315 | B2 * | 6/2005 | Hutchinson | B01F 33/5011 | 416/227 R |
| D644,875 | S * | 9/2011 | Audette | D7/378 | |
| 8,714,807 | B2 * | 5/2014 | Obersteiner | A47J 43/0711 | 366/331 |
| 9,914,101 | B1 * | 3/2018 | Schrudder | B01F 33/50115 | |
| 10,220,358 | B2 * | 3/2019 | Morton | B01F 33/50115 | |
| 2011/0116341 | A1 * | 5/2011 | Obersteiner | B01F 27/071 | 366/344 |

* cited by examiner

*Primary Examiner* — David L Sorkin
(74) *Attorney, Agent, or Firm* — Christopher R. Ganter, LLC

(57) ABSTRACT

A mixing device for use with an electric drill for mixing drywall mud, tile grout, concrete mixes and paint in various size containers and smaller applications. A mixing device is disclosed having a shaft, a central hub and mixing rods that are equidistant from each other and have a side vertical portion and a flat bottom portion such that the mixing device can efficiently mix all material that is on the sidewalls and bottom of a mixing container.

8 Claims, 6 Drawing Sheets

DRYWALL MUD MIXING DEVICE

FIELD OF THE INVENTION

The present invention relates to the drywall finishing industry. More specifically, the present invention relates to a drywall joint compound mixing device.

BACKGROUND OF THE INVENTION

The installation of drywall in a structure requires a joint compound or drywall mud that is used to fill in seams between drywall panels and other imperfections such as nail divots, corners, and gaps between other sheets of drywall. Joint compound is a powder substance consisting primarily of gypsum dust and limestone. To form the drywall mud, water is mixed with the joint compound. Traditionally, this has been done by hand with a putty knife and drywall pan and is a very time-consuming process. There have been some improvements with mixing large quantities of joint compound with the use of rotating paddle mixers operated using an electric drill, however these rotating paddle mixers have several shortcomings. First, they cannot completely mix all of the joint compound powder located in the vessel due to the angles of a drywall mud vessel. Second, they cannot mix small quantities such as the type that would fit in a drywall mud pan. Third, these paddle mixers have a tendency to sling the drywall mud all around a space such that it creates a mess for an installer to clean up. Finally, and among other disadvantages, these prior art paddle mixers have to be cleaned by hand to prevent the joint compound from setting up and hardening on the paddle mixers. What is needed in the art is a drywall mud mixing device that is adaptable to smaller containers and can mix the dry joint compound that is found in corners, the bottom, and on sidewalls completely. Additionally, what is needed in the art is a drywall mud mixing device that can quickly and efficiently mix drywall mud in a non-messy manner and that can be cleaned very quickly.

SUMMARY OF THE INVENTION

The invention disclosed is a drywall mud mixing device comprising a hexagonal shaft that is insertable into an electrical drill bit aperture. Located a distance down the shaft is a central hub that is attached to the shaft. The central hub has apertures on its bottom surface aligned in a circular pattern and said apertures have a depth that travels upward into the central hub. Insertable into said apertures are stainless steel rods. Said stainless steel rods are shaped such that they form a mixing shape that includes straight vertical sidewalls and a flat bottom such that the mixing device can mix joint compound powder located on the bottom of a flat mixing pan, corners of a mixing pan and flat sidewalls of a mixing pan.

DETAILED DESCRIPTION

Figure 1:
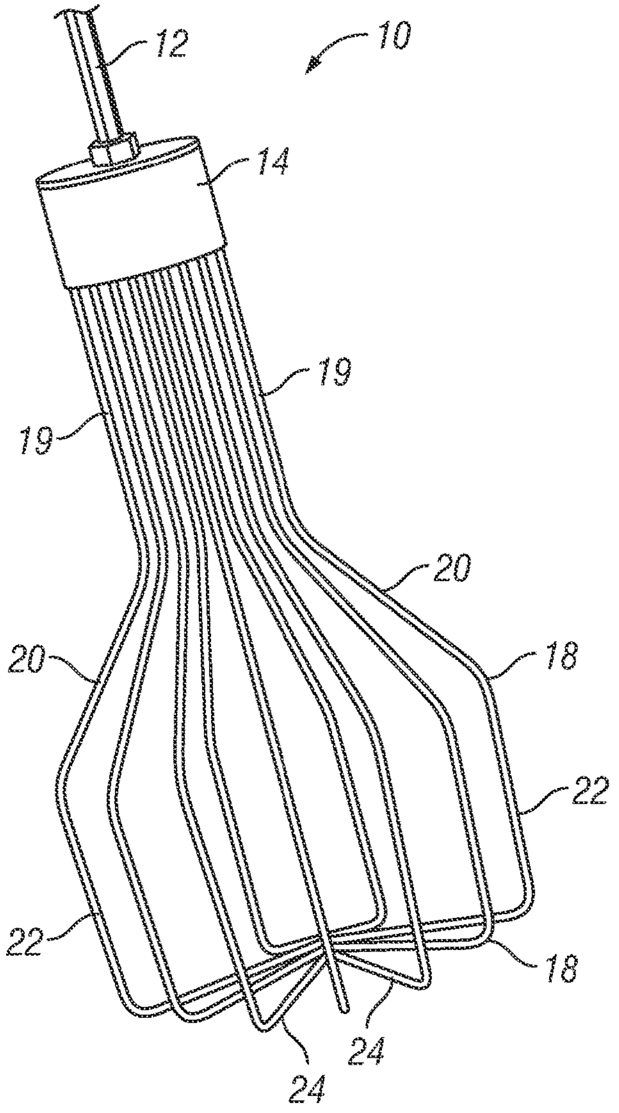
FIG. 1 is a side perspective view of the mixing device.
Figure 2:
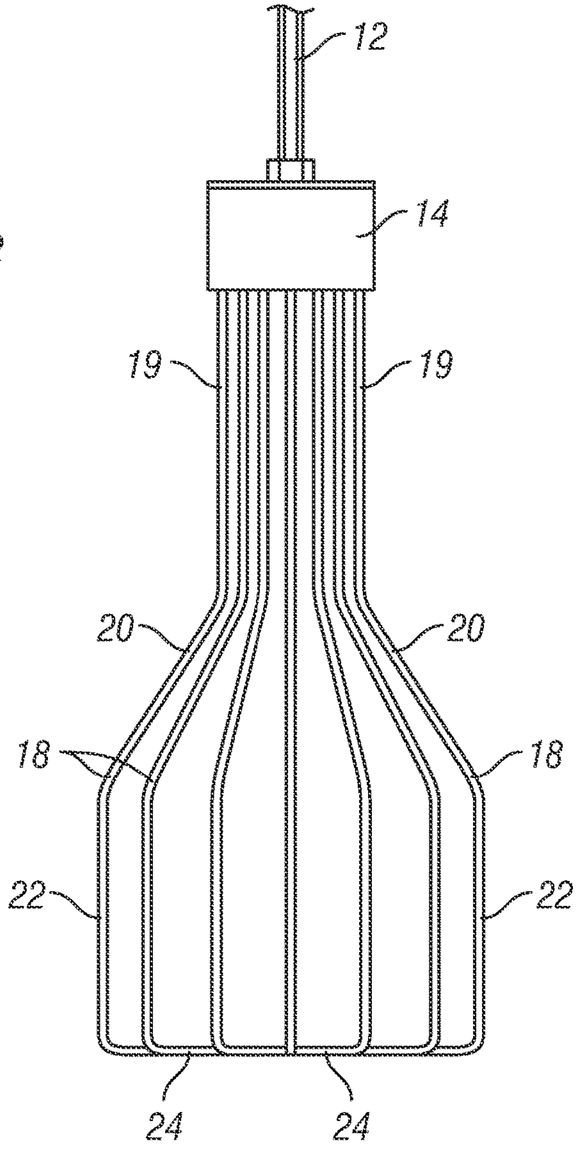
FIG. 2 is a side plan view of the mixing device
Figure 3:
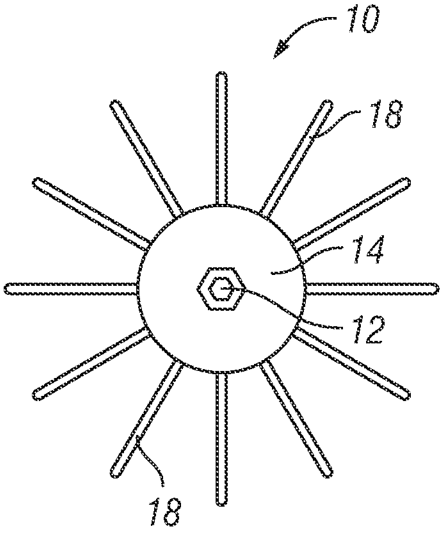
FIG. 3 is a top plan view of the mixing device.
Figure 4:
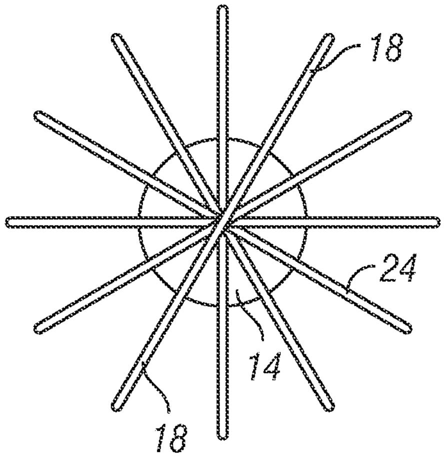
FIG. 4 is a bottom plan view of the mixing device.
Figure 5:
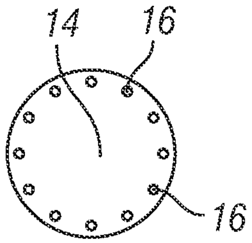
FIG. 5 is a bottom plan view of the central hub.
Figure 6:
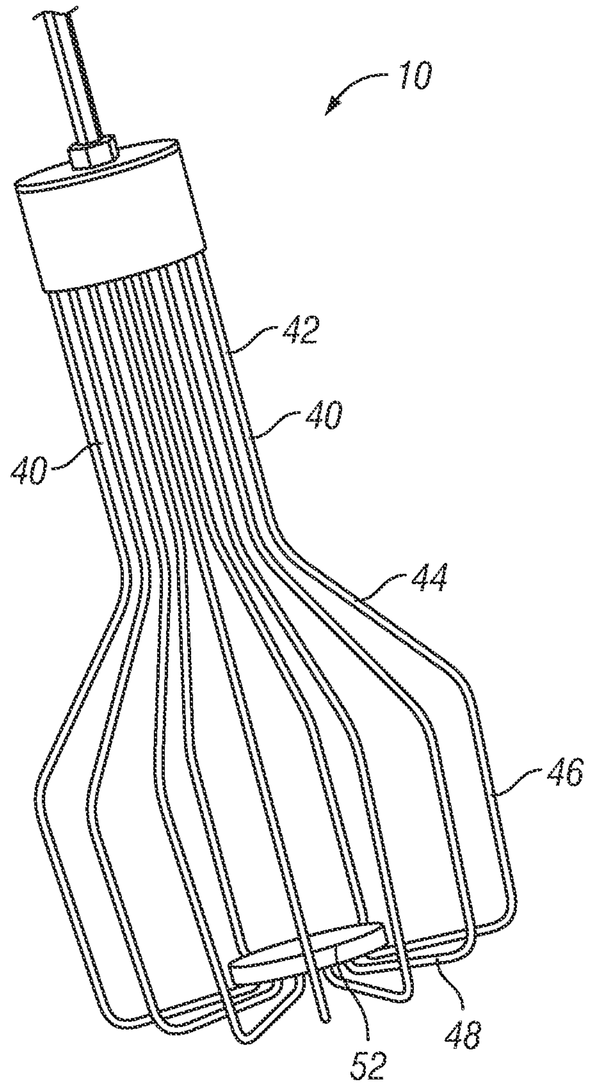
FIG. 6 is a side perspective view of an alternate embodiment of the invention.
Figure 7:
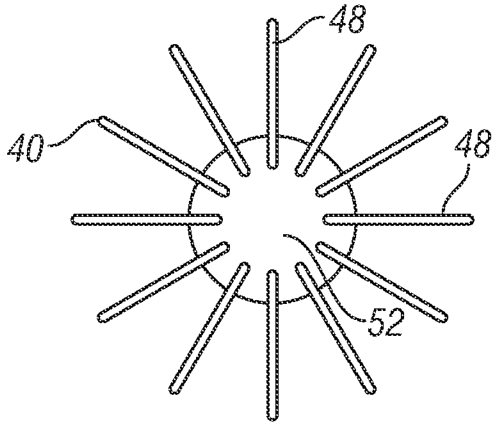
FIG. 7 is a bottom plan view of an alternate embodiment of the invention.
Figure 8:
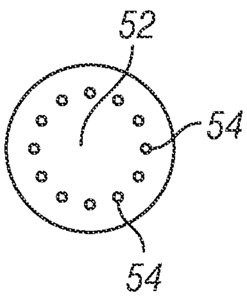
FIG. 8 is a bottom plan view of the bottom hub.
Figure 9:
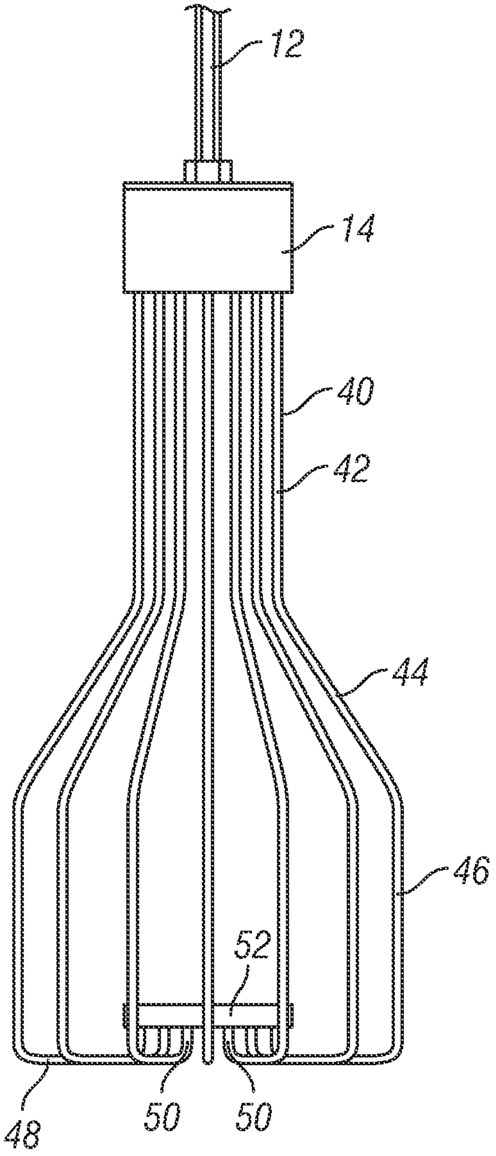
FIG. 9 is a side plan view of the alternate embodiment of the invention.
Figure 10:
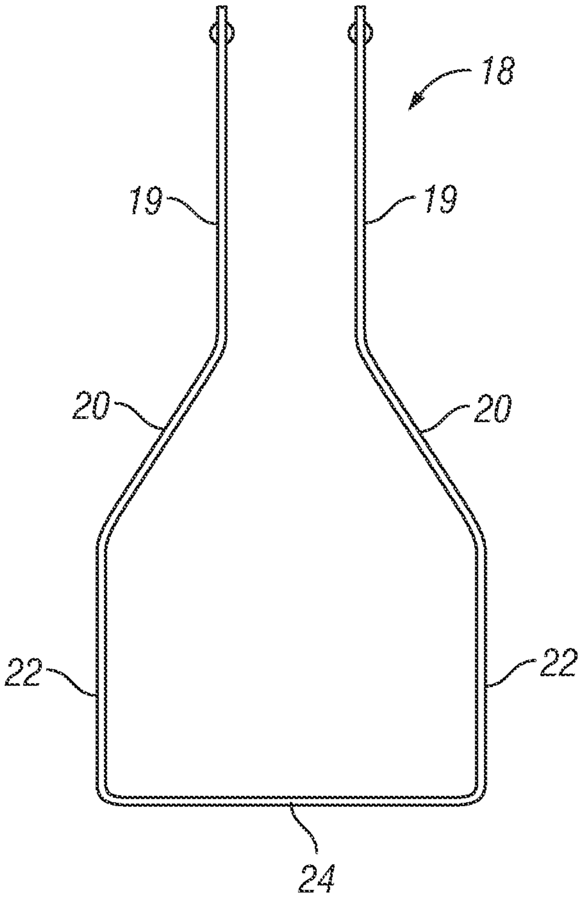
FIG. 10 shows a front plan view of one embodiment of a mixing rod.
Figure 12:
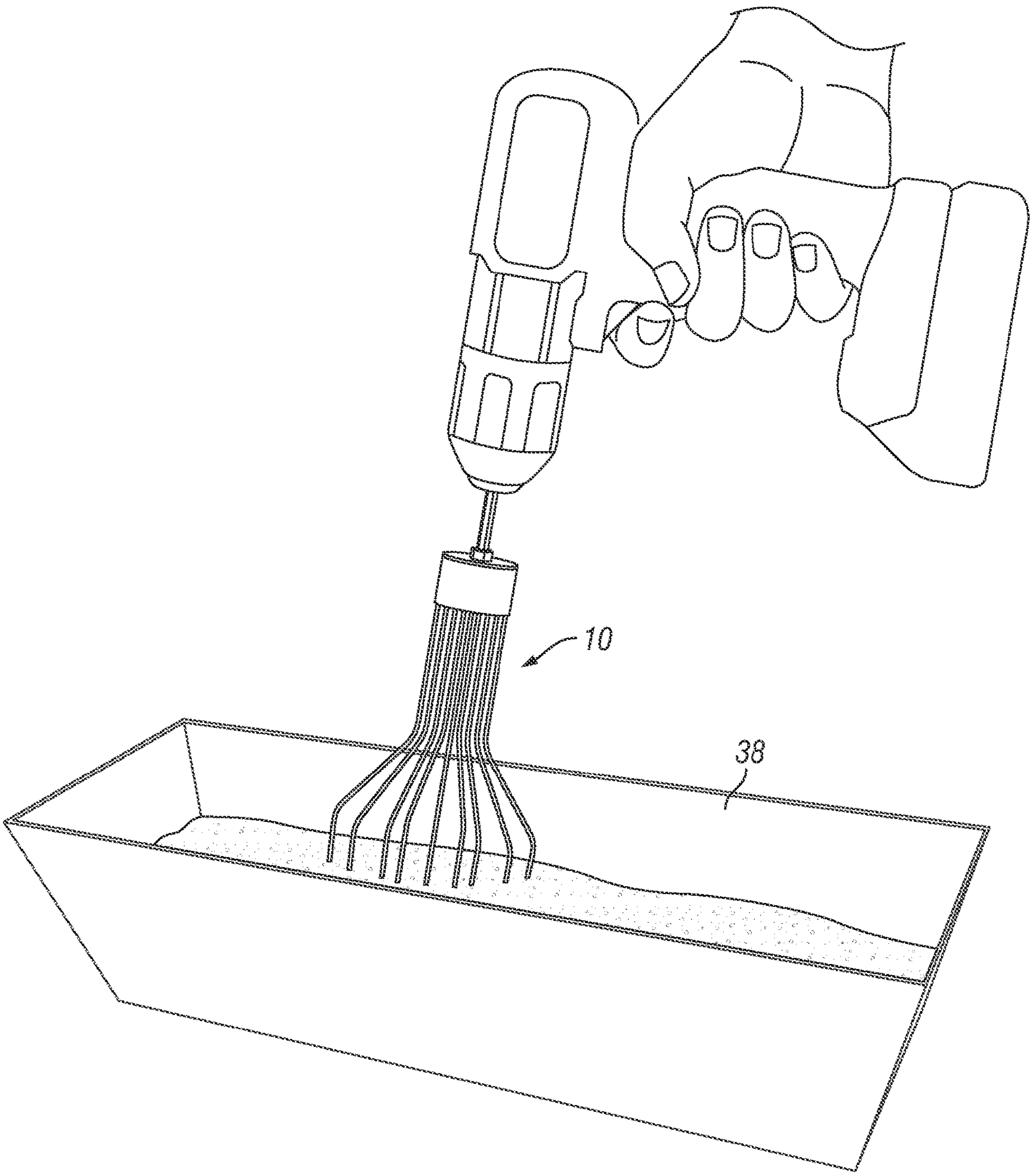
FIG. 12 is a top perspective view of a mud pan and the mixing device in use.

Referring now to FIGS. 1-4 there is shown the drywall mud mixing device 10 having a shaft 12 that is connected to a central hub 14. The shaft 12 in one embodiment is hexagonal in shape along its length and generally ¼ inch wide. Referring to FIG. 5, located in the central hub 14 bottom surface are apertures 16 which are adapted to receive a plurality of mixing rods 18. The mixing rods 18 can in one embodiment be formed of a single length of stainless steel rod that is $1/16^{th}$ to $3/32^{nd}$ inch or 1.5 mm in diameter. The mixing rod 18 is then bent at a right angle in two places in its middle section such that the two parallel vertical sections 22 of the mixing rod 18 are created, are equal in length and perpendicular to a generally 2.5 inch bottom length 24 of the mixing rod 18 as shown in FIG. 10. A distance up the length of the vertical mixing rod 18 vertical sections 22 there is a bend that is formed creating an angled shoulder that is formed such that each parallel vertical sections 22 end is angled toward each other to create two angled portions 20 such that they are no longer parallel for a length and then the angled sections 20 are bent back such that they are once again become two upper parallel vertical portions 19 but much closer together so that they can be inserted into the 16 apertures in the central hub 14. The apertures 16 are aligned in a circular and equidistant fashion on the bottom surface of the central hub 14 and extend a depth into the central hub 14. A pre-bent mixing rod 18 is then installed into the central hub 14 apertures 16. Each end of the mixing rod 18 will be installed into apertures 16 that are directly opposite each other. The mixing rods 18 will be installed one after another such that each mixing rod 18 bottom length 24 overlaps the previous mixing rod 18 bottom length 24 until there is a final bottom length 24 on the bottom of the mixing device 10. It is this final bottom length 24 of the last installed mixing rod 18 that will come directly into contact with the bottom surface of a drywall mud pan 38 when it is mixing drywall joint compound with water. The final bottom length 24 allows for efficient mixing of the dry joint compound with water such that no waste of the dry compound occurs due to the flush contact with all flat surfaces in the bottom of the mud pan 38 and the sidewalls of the mud pan. The flat non-curved sides of the mixing device 10 mixing rods 18 allows the mixing device 10 to fit flush and parallel to the sides of the mud pan 38. The angled sidewalls of a typical mud pan 38 are angled outward and are narrower at the bottom of the mud pan 38 and wider at the top of the mud pan as shown in FIG. 12. This design feature allows for a drywall installer to more efficiently manipulate the drywall mud with a putty knife and it also allows an installer to easily hold the mud pan 38 at its base with one hand while they install the drywall mud onto a surface.

Figure 11:
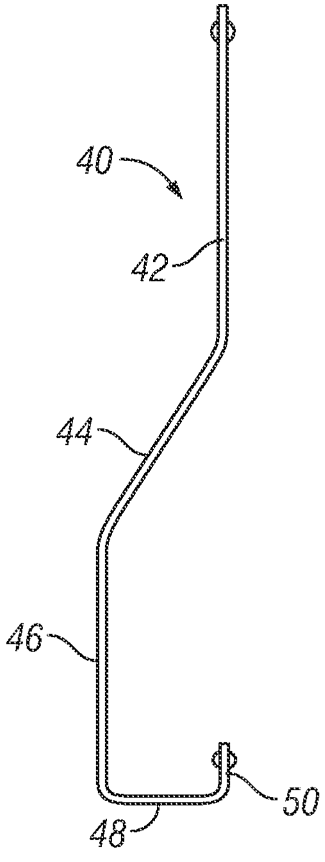
FIG. 11 shows a front plan view of an alternate embodiment of a mixing rod.

Referring now to FIGS. 6-9 there is shown an alternate embodiment of the mixing device 10. The mixing device 10 has a shaft 12 that is hexagonal in cross section and is connected to a central hub 14. In addition there are apertures 16 on the bottom surface of the central hub 14 that are adapted to receive mixing rods 40 as shown in FIG. 11. Each mixing rod 40 has a top vertical portion 42, an angled portion 44 whereby a bend is located at the junction of the top vertical portion 42 and the angled portion 44, a side vertical portion 46 whereby there is a bend at the junction of the angled portion 44 and the side vertical portion 46 whereby the mixing rod 40 side vertical portion 46 has been straightened to a vertical orientation such that the side vertical portion will be parallel to a mud pan or bucket sidewall. At the bottom of the side vertical portion 46 there is a ninety degree bend of the mixing rod 40 such that a bottom flat portion 48 of the mixing rod has been formed and extends inward. At the end of the bottom flat portion 48 there is a ninety degree bend upwards such that a small mounting portion 50 of the mixing rod 40 is inserted into apertures 54 that are located in a bottom hub 52 that has a circular array of apertures 54 on its bottom surface. An adhesive can be used to permanently install the mounting portion 50 of the mixing rod 40 into the bottom hub 52 aperture 54. Additionally, if the bottom hub 52 is made of stainless steel, the mounting portion 50 can be welded to the bottom hub after insertion of the mounting portion 50 of the mixing rod into an aperture 54 located on the bottom surface of the bottom hub 52. The bottom hub 52 can also be made of a hard and resilient plastic or polymer.

The mixing device 10 solves many problems that exist in the art with respect to mixing small quantities of drywall mud. Often times, certain projects do not require a full 5-gallon bucket of drywall mud which is a standard size in the industry, but requires smaller amounts of drywall mud. Currently, small amounts of drywall mud such as that which would occupy a 12 inch to 14 inch mud pan are mixed by hand with a putty knife. This is a time-consuming process and takes a competent drywall installer close to five minutes to thoroughly mix the drywall mud to a consistent and non-lumps consistency. With the mixing device 10 in accompaniment with an electric drill, the mixing process can be finished in under a minute and many times under thirty seconds. This is especially important when using quick setting drywall that cures in twenty minutes. Given that traditional mixing of drywall mud with a putty knife takes around five full minutes to achieve consistent and homogenous mixture, the mixing device 10 makes a tremendous difference on what a drywaller installer can achieve on a particular project before the quick setting drywall mix sets up in a mud pan and on a putty knife. The mixing device 10 is cleaned by inserting it into a bucket of water and hitting the power button on the electric drill. This process takes about five seconds whereas traditional putty knives or other paddle mixers must be cleaned by hand due to the angles of the surfaces inherent to the paddles such that when they are rotated in a bucket of water they do not fully get clean. A further problem with paddle mixers is they have a major tendency to throw drywall mud outside of the mixing container creating messy conditions in a living space. The disclosed mixing device 10 avoids this problem because of the circular cross-sectional shape of the mixing rods cuts right though the drywall mud with little resistance and turbulence. The flat bottom of the mixing device 10 allows for direct contact with the entire bottom of a mud pan and the square or flat sides of the mixing device 10 allows the mixing device 10 to reach cover the entire surface area of a drywall mud pan 38 such that all of the joint compound materials is mixed and the sides of the mud pan 38 left clean. In addition to drywall mud, the mixing device 10 works very well for mixing grout, concrete and paint and can be used interchangeably for these materials.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

ENUMERATED ELEMENTS

10 mixing device
12 shaft
14 central hub
16 apertures
18 mixing rods
19 upper parallel vertical portion
20 angled portion
22 parallel vertical portion
24 bottom flat length
38 mud pan
40 mixing rod
42 top vertical portion
44 angled portion
46 side vertical portion
48 bottom flat portion
50 mounting portion
52 bottom hub
54 apertures

I claim:

1. A mixing device, comprising:

a shaft connected to a central hub;

a plurality of mixing rods connected to the central hub whereby the mixing rods each have a vertical side portion that is parallel to a sidewall of a mixing container and a bottom flat portion that is parallel with a bottom surface of a mixing container and whereby the junction of the vertical portion of the mixing rod and bottom flat portion of the mixing rod is bent at a right angle and said mixing rods further comprise a vertical mounting portion which is connected with a bottom hub such that the bottom flat portion of each said rod is direct contact with the bottom of a mixing container as opposed to the bottom hub.

2. The mixing device of claim 1 wherein each said mixing rod is formed out of a single length of metal wire.

3. The mixing device of claim 2 wherein the mixing device of claim 2 further comprises a top vertical portion of the mixing rod that merges into an angled portion which merges into said vertical side portion.

4. The mixing device of claim 3 wherein the central hub has on its bottom surface apertures that extend a depth into the central hub and are adapted to receive a plurality of mixing rod top vertical portion ends installed into said central hub apertures in a circular array and said bottom hub bottom surface has apertures that extend a depth into the bottom hub and are adapted to receive a plurality of mixing rod mounting portions installed into said bottom hub in a circular array.

5. The mixing device of claim 4 wherein the distance between one mixing rod vertical side portion and a second mixing rod vertical side portion located 180 degrees in relation to the first mixing rod vertical side portion is generally about 2.3-2.5 inches wide.

6. The mixing device of claim 5 wherein the mixing device at its widest point is 2.5 inches in diameter.

7. The mixing device of claim 1 wherein the mixing device at its widest point is 2.5 inches in diameter.

8. The mixing device of claim 1 wherein the shaft is hexagonal and insertable into an electric drill chuck.

* * * * *